United States Patent [19]

Yoshida et al.

[11] 4,419,000
[45] Dec. 6, 1983

[54] CAMERA CAPABLE OF AUTOMATIC FILM ADVANCING AND REWINDING

[75] Inventors: Fumio Yoshida, Osaka; Yukio Miki, Sakai; Takeshi Egawa, Osaka, all of Japan

[73] Assignee: Minolta Camera Kabushiki Kaisha, Osaka, Japan

[21] Appl. No.: 312,569

[22] Filed: Oct. 19, 1981

[30] Foreign Application Priority Data

Oct. 27, 1980 [JP] Japan ................................. 55-149442

[51] Int. Cl.³ .............................................. G03B 1/12
[52] U.S. Cl. .................................................. 354/173.1
[58] Field of Search ......................................... 354/173

[56] References Cited

U.S. PATENT DOCUMENTS 3,994,003 11/1976 Iwashita et al. ..................... 354/173
4,251,148 2/1981 Stemme et al. ...................... 354/173
4,294,527 10/1981 Hashimoto et al. ............. 354/173 X

*Primary Examiner*—Michael L. Gellner
*Attorney, Agent, or Firm*—Wolder, Gross & Yavner

[57] ABSTRACT

A single lens reflex camera includes a body member having an intermediate compartment containing the photographic and view finding light paths, the shutter, reflex mirror and mirror viewing components and a pair of opposite side compartments respectively housing the film takeup and rewind mechanisms. A motor is housed in a first of the side compartments and a transmission shaft extends from the mechanism in the second compartment to the first compartment through a space offset from the light paths and a selector mechanism alternatively drive couples the transmission shaft at the first compartment housed film mechanism. The selector mechanism is controlled by an externally accessible knob or is responsive to the direction of rotation of the motor.

12 Claims, 7 Drawing Figures

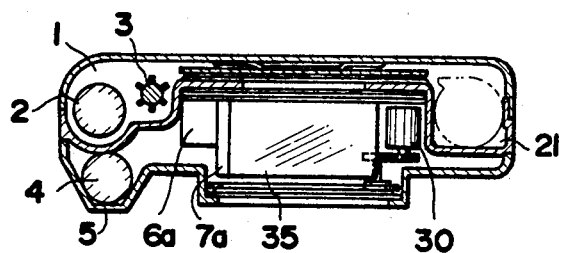
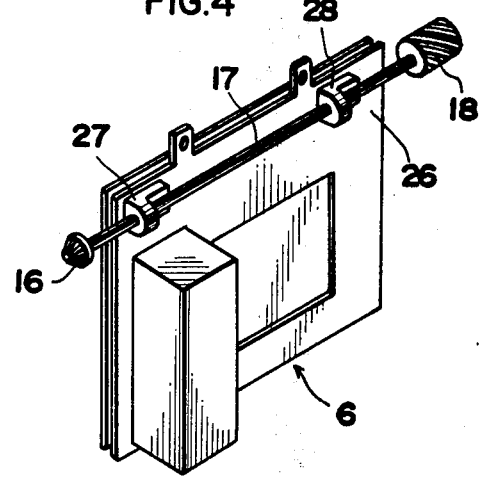
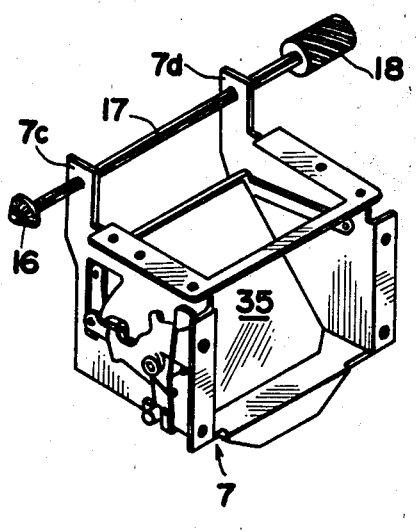
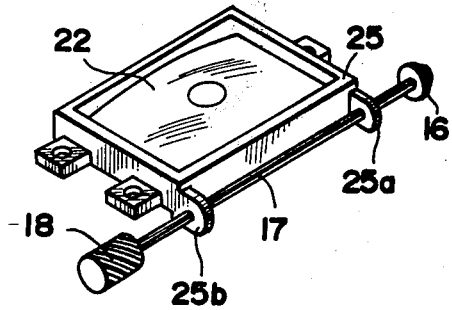

CAMERA CAPABLE OF AUTOMATIC FILM ADVANCING AND REWINDING

BACKGROUND OF THE INVENTION

The present invention relates generally to improvements in cameras with built-in single motor driven film advancing or a film rewinding mechanism, and it relates particularly to an improved mechanism coupling an electric motor with the camera film advancing system or a film rewinding system and the disposition thereof in the camera.

BACKGROUND OF THE ART

A conventional camera has a self-contained or built-in single motor performing both the film advancing and the film rewinding operations. To permit this, the motor is disposed, for example, in a single lens reflex camera, beneath the mirror box inside the camera and is connected to the film advancing mechanism and the film rewinding mechanism by means of a connecting member. As a result, an increased space is required beneath the mirror box inside the camera, whereby the height of the camera increases thereby posing the problems that the overall camera size becomes excessively large and the camera inconvenient to handle and carry.

SUMMARY OF THE INVENTION

An object of the present invention is to provide an improved camera having a motor drive mechanism which permits both the film advancing and the film rewinding operations with a single self-contained motor.

Another object of the present invention is to provide an improved motor drive camera of the above nature which is highly compact and of minimal height minimized and is easy and convenient to carry and handle.

Still another object of the present invention is to provide an improved motor driven camera of the above type in the assembly and servicing of the mechanism for transmitting the rotation of the motor within the camera body is convenient and facilitated.

The above and other objects of the present invention will become apparent from a reading of the following description taken in conjunction with the accompanying drawings which illustrate preferred embodiments thereof.

An improved camera in accordance with the present invention with a built in drive motor for performing the film advancing and film rewinding operations is characterized in that the motor is arranged in either a film takeup chamber or a box for housing therein another box for housing therein a film supply chamber located on opposite sides of a mirror box and a viewfinder, and a member for transmitting the rotational drive from the motor to the film advancing mechanism or the film rewinding mechanism is arranged within a spaced located on the film plane side from the focal plate and is located outside the photographic and viewfinder optical paths.

BRIEF DESCRIPTION OF THE DRAWINGS

FIG. 3 is a horizontal cross-sectional view of the camera of FIG. 1;

FIG. 4 is a perspective view showing the outline of the shutter unit in the camera of FIG. 1;

FIG. 5 is a perspective view of an essential part of a second embodiment of the present invention;

FIG. 6 is a perspective view and the essential part of a third embodiment of the present invention.

DESCRIPTION OF THE PREFERRED EMBODIMENTS

Figure 1:
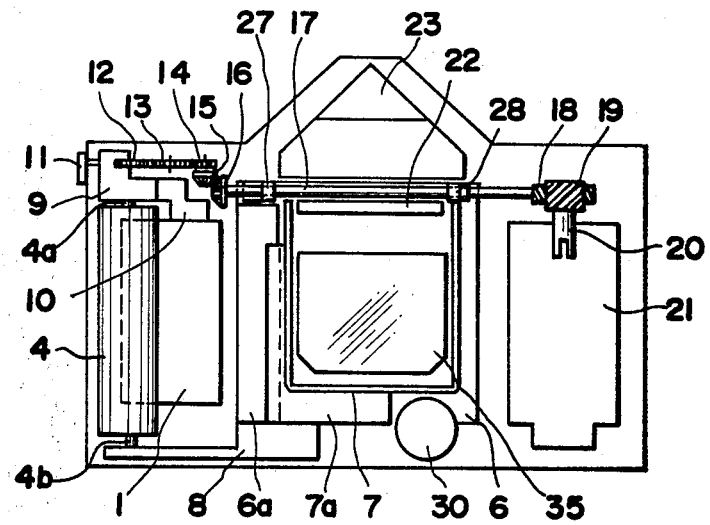
FIG. 1 is a front elevational schematic diagram of the interior of a camera constituting a first embodiment of the present invention.

Referring now to the drawings, particularly FIGS. 1 to 4 thereof which illustrate a preferred embodiment of the present invention, the reference numeral 1 generally designates a film takeup chamber which is provided with a film takeup spool 2 and a film sprocket 3, as shown in FIG. 3. A first drive motor 4 motivates the film advancing and rewinding the operations, as well as the shutter charging operations, the lens diaphragm, the mirror and the other photography associated operations and it is disposed in a grip portion 5 projecting forwardly from the front of the camera body. First motor 4 has upper and lower output drive shafts 4a and 4b projecting upwardly and downwardly from the motor top and bottom, respectively. Lower output shaft 4b is connected to a charging mechanism 8 which charges a shutter drive mechanism 6a coupled to the camera shutter 6 and a diaphragm and mirror drive mechanism 7a provided in a mirror box or camera obscura 7. Upper output shaft 4a is connected to a film advancing mechanism 10 through a clutch mechanism 9. Thus, output shafts 4a and 4b drive spool 2 and sprocket 3 to effect the film advancing operation. A knob 11 defining a selector member projects from the camera body, and the operation thereof effects the transmission of the drive force of first motor 4 selectively alternatively to film advancing mechanism 10 or to a first gear 12 of a transmission mechanism for the film rewinding operation. When selector member 11 is operated to transmit the drive force of first motor 4 through clutch mechanism 9 to first gear 12 it motivates the film rewinding mechanism through a drive train including first gear 12 which meshes with a second gear 13 which, in turn engages a third gear 14 having affixed thereto a first bevel gear 15 which meshes with a second bevel gear 16 fixed to one end of a transmission or drive shaft member 17 having affixed to its opposite end a worm 18 which in turn engages a worm 19 provided with a film spool engaging spindle 20 of the film rewinding mechanism, whereby the drive force is transmitted to the film rewinding mechanism.

Figure 2:
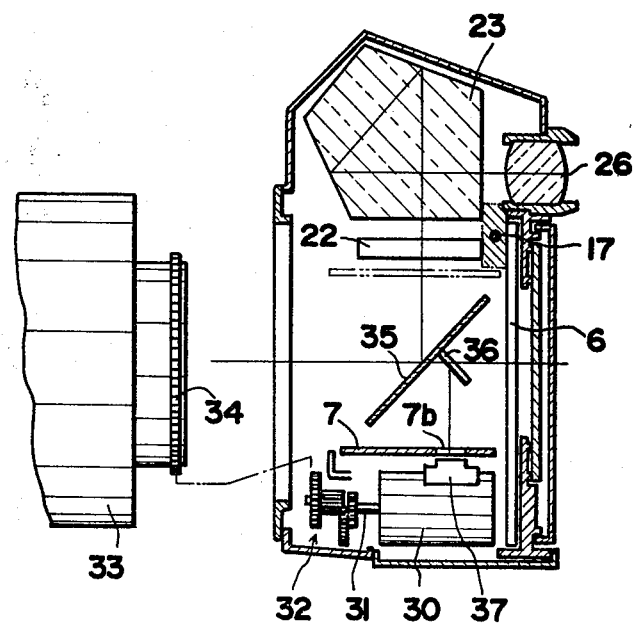
FIG. 2 is a side sectional view of the camera shown in FIG. 1 with the interchangeable lens illustrated in a detached condition.

As shown in FIG. 1, the film rewinding mechanism is provided in a supply chamber 21 in a box adjacent to a central box or compartment housing therein mirror box 7, a focusing screen 22 and a pentagon prism 23 and the viewfinder system associated therewith, which are disposed nearly at the center of the camera body. Located at another side of and adjacent to the central box is another box for housing therein takeup housing 1 and first motor 4. As shown in FIG. 2, transmission shaft member 17 is disposed outside the photographic optical path within a space indicated by hatching and surrounded by shutter unit 6, an eyepiece 26, focusing screen 22 and pentagon prism 23. As shown in FIG. 4, transmission shaft member 17 is rotatably supported by transversely spaced bearing members 27 and 28 fixed to shutter and film framing unit 6. Film rewinding spindle or fork 20 connected to worm wheel 19 projects into supply chamber 21. Film rewinding fork 20 is releasably coupled to the film shaft of a film patrone when the patrone is loaded in the camera.

During the film rewinding operation, the drive force of first motor 4 provided in the box left side of the camera body rotates film rewinding fork 20 disposed in the box at the right side of the camera body through transmission shaft member 17 for film rewinding.

A second motor 30 for automatic focusing is positioned under mirror box 7 and, as shown in FIG. 2, has drive shaft 31 disposed almost parallel to the camera photographic optical axis and is separably drive coupled to the focusing gear 34 of an exchangeable lens 33 through a gear assembly 32 when the exchangeable lens 33 is mounted on the camera.

A swingable reflector mirror 35, disposed in its viewing position at an angle of 45° to the photographic optical axis in mirror box 7, has a light transmitting opening or a semi-transparent portion provided therein. Positioned on the rear of movable reflecting mirror 35 is an auxiliary mirror 36 which directs the light transmitted through the light transmitting portion toward a range finding light receiving element 37, which is opposed to an opening 7b formed in the floor of mirror box 7.

Instead of supporting transmitting shaft member 17 by bearing members 27 and 28 provided on unit shutter 6, transmitting shaft 17 may be rotatably supported by laterally spaced, bearing bracket portions 7c and 7d provided on and projecting upwardly from the rear of mirror box 7, as shown in FIG. 5. Furthermore, as illustrated in FIG. 6, transmitting shaft members 17 may be rotatably supported by laterally spaced ears defining bearing portions 25a and 25b provided on holder member 25 which holds focusing screen 22.

Figure 7:
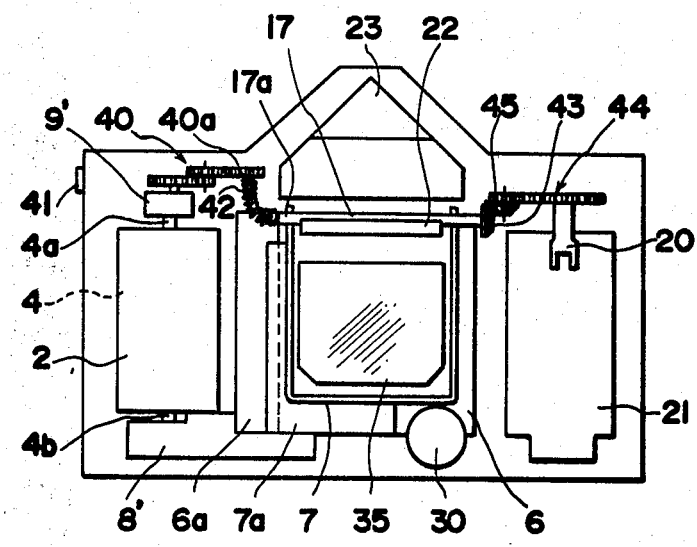
FIG. 7 is a view similar to FIG. 1 illustrating a fourth embodiment of the present invention.

FIG. 7 shows a further embodiment of the present invention, wherein first motor 4 for the film advancing and rewinding operations and also for the charging operations of the shutter, the diaphragm and the mirror, is disposed in the spool. Shaft 4b projected downward from first motor 4 is connected through a first clutch mechanism 8' to drive mechanism. First clutch mechanism 8' is arranged such that it is capable of transmitting the rotation of shaft 4b only in a predetermined direction. Moreover, shaft 4a projecting upwardly from motor 4 is connected through a second clutch mechanism 9' to a transmission gear assembly 40 for film rewinding. Second clutch mechanism 9' is arranged so that it is capable of transmitting the rotation of shaft 4a to transmission gear assembly 40, only when shaft 4a is rotated in the opposite direction to the predetermined direction of rotation of shaft 4b. When a selector member 41 provided outside the camera body is set in a film rewind position, first motor 4 is rotated in the opposite direction to that for advancing a film and charging the shutter, the diaphragm and the mirror by using a well known circuit, whereby only transmission gear assembly 40 for film rewinding is rotated by way of second clutch mechanism 9'. An output shaft 40a of gear assembly 40 is drive coupled to one end of a spring 42 constituting a universal or spring joint, and one end 17a of transmitting shaft member 17 rotatably supported by mirror box 7 is drive coupled to the other end of spring 42. As a result, the spring joint allows the rotational motion transmission by translating the rotation axis 90°. A bevel gear 43 affixed to the other end of transmitting shaft member 17 meshes a bevel wheel 45 included in a film rewinding mechanism 44, and transmits the film rewinding drive force of first motor 4 to film rewinding fork 20.

As described above, the present invention is characterized in that a camera body including three boxes, one of which is a central box housing therein the mirror box and another two of which are located at opposite sides of the central box for housing therein a film advancing mechanism and film rewinding mechanism respectively. The present invention is also characterized in that a drive motor is arranged on either one of the boxes adjacent to the central box with its drive force transmitting shaft projecting upward, and that a transmission shaft member, which connects the drive force transmitting shaft to a film advancing mechanism or a film rewinding mechanism, which is housed in another one of the boxes adjacent to the central box, is disposed in a space, located above the mirror box outside the photographic optical axis, as surrounded by the focal plane shutter, the focusing screen, the pentagon viewfinder prism and the eyepiece. Consequently, according to the present invention, a motorized single-lens reflex camera which is overall highly compact may be achieved. In addition, it is possible to improve the transmission efficiency of the drive force of a small drive motor and also to provide a single-lens reflex camera with a small low-noise motor built therein. Moreover, as is evident from the above described embodiments, when the bearing portions for the transmitting shaft member are provided on a focusing screen holder, a unit shutter or a mirror box, the assembly and overhaul thereof may be simplified.

While there have been described and illustrated preferred embodiments of the present invention, it is apparent that numerous alterations, omissions and additions may be made without departing from the spirit thereof.

What is claimed is:

1. A camera having a first box and second and third boxes located at opposite sides of and adjacent to said first box, said first box including a camera obscura and view finder optical elements including a focusing screen, one of said second and third boxes having a film supply chamber for housing therein an un-exposed film and the other of said second and third boxes having a film takeup chamber for storing therein an exposed film, said camera comprising:
   a film advance mechanism for winding the film, said film advance mechanism being provided in the box wherein said film takeup chamber is housed;
   a film rewind mechanism for rewinding the film stored in said film takeup chamber, said film rewind mechanism being provided in the box wherein said film supply chamber is housed;
   an electric motor provided in said second box;
   a rotatable drive shaft connected to one of said advance and rewind mechanisms which is housed in said third box, said rotatable drive shaft traversing an area adjacent to said focusing screen in said first box and out of a finder optical path; and
   means for alternatively transmitting the rotation of said electric motor to said drive shaft and said one of said advance mechanism and rewind mechanism which is housed in said second box.

2. A camera having a first box and second and third boxes which are located at opposite sides of and adjacent to said first box, said first box including a camera obscura and view finder optical elements including a focusing screen, one of said second and third boxes having a film supply chamber for housing therein an un-exposed film and the other of said second and third boxes having a film takeup chamber for storing therein an exposed film said camera comprising:
- a film advance mechanism for advancing the exposed film towards said film takeup chamber, said film advance mechanism being provided in the box wherein said film takeup chamber is housed;
- a film rewind mechanism for rewinding the exposed film into said film supply chamber, said film rewind mechanism being provided in the box wherein said film supply chamber is housed;
- a rotatable drive shaft connected to one of said film advance mechanisms and said film rewind mechanism which is housed in said third box, said rotatable drive shaft traversing an area adjacent to said focusing screen in said first box and out of a finder optical path formed by said view finder optical elements;
- an electric motor provided in said second box;
- first motion transmission means for transmitting said electric motor's rotation in predetermined direction to said rotatable shaft;
- second motion transmission means for transmitting said electric motor's rotation in a direction opposed to said predetermined direction to another one of said film advance mechanism and said film rewind mechanism which is housed in said second box; and
- a manually operable selector means for selecting the direction of the rotation of said electric motor.

3. A camera as set forth in claim 1 or 2, wherein said electric motor is provided in the box in which said film advance mechanism is housed.

4. A camera as set forth in claim 1 or 2, wherein said finder optical elements include a movable mirror movable between a viewing position diagonally located in said camera obscura and a photographing position retracted out of the photographic optical path and a finder eyepiece wherein said rotatable drive shaft traverses an area delineated by said movable mirror, finder eyepiece and focussing screen.

5. A camera as set forth in claim 4, wherein said camera obscura includes a mirror box rotatably supporting said movable mirror, said mirror box being provided with supporting portions for rotatably supporting said rotatable drive shaft.

6. A camera as set forth in claim 4, further comprising a holder carrying the focusing screen, said holder being provided with supporting portions for rotatably supporting said rotatable drive shaft.

7. A camera as set forth in claim 4 further comprising a unit shutter, said unit shutter being provided with supporting members for rotatably supporting said rotatable drive shaft.

8. A motorized camera comprising:
- a camera body including an intermediate compartment containing a focusing screen and the camera photographic and view finding light paths and a pair of side compartments adjacent opposite sides of said intermediate compartment, one of said side compartments having a film supply chamber and the other of said side compartments having a film takeup chamber;
- a film takeup mechanism disposed in one of said side compartments;
- a film rewind mechanism disposed in the other of said side compartments;
- a drive motor disposed in one of said side compartments;
- a transmission shaft extending between said side compartments and adjacent to said focusing screen in said intermediate compartment and offset from said photographic light path and having a first end drive coupled to a first of said mechanism and an opposite second end; and
- transfer means for alternatively drive coupling the output of said motor to the second of said mechanisms or to said shaft second end.

9. The motorized camera of claim 8 wherein said transfer means includes manually operable selector means accessible externally of said camera body for controlling said transfer means.

10. The motorized camera of claim 8 wherein said motor is reversible and said transfer means is responsive to the direction of rotation of said motor.

11. The motorized camera of claim 8 wherein said side compartment in which said motor is disposed includes a forwardly projecting grip defining portion housing said motor.

12. The motorized camera of claim 8 wherein said film takeup mechanism includes a takeup spool disposed in said takeup chamber and said motor is housed in said takeup spool.

* * * * *